US009334777B2

(12) United States Patent
Guenther et al.

(10) Patent No.: US 9,334,777 B2
(45) Date of Patent: May 10, 2016

(54) FLUID CONDUIT ARRANGEMENT

(71) Applicant: Hartmann Controls, Inc., Hartland, WI (US)

(72) Inventors: Henry Guenther, Elm Grove, WI (US); Mark Blumreiter, Waukesha, WI (US)

(73) Assignee: Hartmann Controls, Inc., Hartland, WI (US)

( * ) Notice: Subject to any disclaimer, the term of this patent is extended or adjusted under 35 U.S.C. 154(b) by 209 days.

(21) Appl. No.: 14/059,593

(22) Filed: Oct. 22, 2013

(65) Prior Publication Data
US 2014/0116522 A1 May 1, 2014

Related U.S. Application Data

(60) Provisional application No. 61/718,422, filed on Oct. 25, 2012.

(51) Int. Cl.
| *F16K 7/07* | (2006.01) |
| *F01N 3/20* | (2006.01) |
| *F16L 55/07* | (2006.01) |
| *F16L 55/10* | (2006.01) |

(52) U.S. Cl.
CPC ............... *F01N 3/2066* (2013.01); *F16K 7/07* (2013.01); *F16L 55/07* (2013.01); *F16L 55/10* (2013.01); *F01N 2610/02* (2013.01); *F01N 2610/14* (2013.01); *F01N 2610/1493* (2013.01);
(Continued)

(58) Field of Classification Search
CPC ..... F16L 55/07; F16K 7/07; Y10T 137/0368; Y10T 137/4643
USPC .......... 251/5, 4; 137/209, 843, 853, 219, 220, 137/628, 488
See application file for complete search history.

(56) References Cited

U.S. PATENT DOCUMENTS 3,441,245 A * 4/1969 Holland et al. .................. 251/5
3,485,472 A * 12/1969 Bozich .............................. 251/5
4,056,965 A * 11/1977 Heiser .............................. 72/351
(Continued)

FOREIGN PATENT DOCUMENTS

| DE | 10 2011 014026 A1 | 9/2012 |
| EP | 2 514 937 A1 | 10/2012 |
| FR | 2 567 611 A1 | 1/1986 |

OTHER PUBLICATIONS

International Search Report and Written Opinion for corresponding application PCT/US13/66036, having a mailing date of Feb. 12, 2014.

*Primary Examiner* — John Bastianelli
*Assistant Examiner* — Andrew J Rost
(74) *Attorney, Agent, or Firm* — Andrus Intellectual Property Law, LLP

(57) ABSTRACT

A fluid conduit arrangement includes a reservoir containing a pressurized gas therein. An outer rigid conduit in communication with the reservoir contains a first working fluid under pressure from the pressurized gas within a closed system defined by the reservoir and the outer rigid conduit. An inner flexible conduit is provided for conducting a second working fluid therethrough upon application of a supply pressure. The inner flexible conduit is disposed within the outer rigid conduit, and is subjected to the pressurized first working fluid in surrounding relationship therewith. Relative differences between the pressurized first working fluid and the second working fluid enable the inner flexible conduit to either expand and permit free flow of the second working fluid therethrough, or collapse and evacuate flow of the second working fluid therefrom.

20 Claims, 4 Drawing Sheets

(52) U.S. Cl.
   CPC ............ *Y02T10/24* (2013.01); *Y10T 137/0368* (2015.04); *Y10T 137/4643* (2015.04)

(56) References Cited

U.S. PATENT DOCUMENTS

| | | | |
|---|---|---|---|
| 4,108,418 A * | 8/1978 | Ensign et al. | 251/5 |
| 4,195,810 A * | 4/1980 | Lavin | 251/5 |
| 5,036,879 A * | 8/1991 | Ponci | 137/496 |
| 5,305,982 A * | 4/1994 | Tamari | 251/5 |
| 5,535,983 A * | 7/1996 | Hohermuth | 251/5 |
| 6,102,361 A * | 8/2000 | Riikonen | 251/5 |
| 6,106,506 A | 8/2000 | Abell et al. | |
| 7,832,431 B2 * | 11/2010 | Doig | 137/853 |

* cited by examiner

FLUID CONDUIT ARRANGEMENT

CROSS-REFERENCE TO RELATED APPLICATION

The present application relates to and claims priority based on U.S. Provisional Patent Application Ser. No. 61/718,422 filed Oct. 25, 2012.

BACKGROUND OF THE INVENTION

The present disclosure relates generally to a fluid conduit arrangement, and more particularly, pertains to a fluid conduit arrangement employing a closed system to completely and conveniently evacuate a conduit or hose of any remaining fluid, such as liquid or gas, remaining therein.

In certain applications, such as where temperatures may cause viscosity changes (e.g. in fuel lines, hydrants, etc), it is desirable to provide a conduit arrangement which will evacuate a working fluid. In these cases, it is further desirable that the working fluid is forced by an accumulator pressurized system fluid (liquid or gas) back down a hose into a supply vessel or system. There is also a need to design a conduit arrangement for applications requiring evacuation of a line because of freezing, reactivity, safety, etc. For example, when supplying DEF (Diesel Exhaust Fluid) to a vehicle, the reservoir is heated, but the supply line is not and can freeze. In this case, when the supply source is disconnected from the conduit, it is desirable that the accumulator pressure forces the DEF fluid up and into an on-vehicle reservoir and out of the conduit. A similar scenario is desired for conduits that would transport hazardous or volatile liquids where there is a need to evacuate the transferred fluid from the transferred conduit after the transfer from a supply source to the apparatus using the fluid is complete.

SUMMARY OF THE INVENTION

The present disclosure relates to a fluid conduit arrangement having a reservoir containing a pressurized gas therein. An outer rigid conduit is in fluid communication with the reservoir, and contains a first fluid wider pressure from the pressurized gas within a closed system defined by the reservoir and the outer rigid conduit. An inner flexible conduit is provided for conducing a second fluid therethrough upon application of a supply pressure. The inner flexible conduit is disposed within the outer rigid conduit, and is subjected to the pressurized first fluid in surrounding relationship therewith. Relative differences between the pressurized first fluid and the second fluid enable the inner flexible conduit to either expand and permit free flow of the second fluid therethrough, or collapse and evacuate flow of the second fluid therefrom.

In the fluid conduit arrangement, the reservoir is rigid and the outer rigid conduit includes an extension conduit. The outer rigid conduit and the extension conduit are non-compressible and non-expandable. Both the first fluid and the second fluid may be a gas or a liquid. In the exemplary embodiment, the first fluid is antifreeze and the second fluid is diesel exhaust fluid. The first fluid continuously surrounds the inner flexible conduit, remains captive in the outer rigid conduit and the extension conduit, and is able to flow freely to and from the reservoir via the extension conduit. The inner flexible conduit has an inlet located adjacent a bottom of the outer rigid conduit, and an outlet positioned adjacent a top of the outer rigid conduit. The second fluid is flowable between the inlet and the outlet. A retaining and discharge structure maintains the inner flexible conduit within the outer flexible conduit, and connects the outer rigid conduit and the extension conduit to the reservoir. The outlet is in communication with a discharge passageway formed in the retaining and discharge structure.

The present disclosure further relates to a method of controlling fluid flow in different locations and comprises the steps of a) providing a reservoir containing a pressurized gas therein: b) providing an outer rigid conduit in fluid communication with the reservoir and containing a first fluid under pressure from the pressurized gas within a closed system defined by the reservoir and the outer rigid conduit; and c) providing an inner flexible conduit for conducting a second fluid therethrough upon an application of a supply pressure, the inner flexible conduit being disposed within the outer rigid conduit and being subjected to the pressurized first fluid and surrounding relationship therewith. Relative differences between the pressurized first fluid and the second fluid enable the inner flexible conduit to either expand and permit free flow of the second fluid therethrough, or collapse and evacuate flow of the second fluid therefrom.

In an equilibrium stage, pressurized gas in the reservoir presses down on the first fluid resulting in an increased pressure on the inner flexible conduit causing it to be collapsed. In a supply pressure stage, a supply pressure is applied to the second fluid at an inlet of the inner flexible conduit such that the inner flexible conduit expands, allowing the second fluid to flow therethrough, the expansion of the inner flexible conduit causing, the first fluid to flow into the reservoir, and pressure in the reservoir to increase. In a constant flow stage, once the inner flexible conduit is fully expanded, the second fluid flows through the inner flexible conduit and exits from an outlet thereof, the resultant pressure in the reservoir being less than the supply pressure of the second fluid. In a pressure shut-off stage, with the supply pressure being shut off, pressure in the reservoir collapses the inner flexible conduit, and second fluid is evacuated out of the inner flexible conduit through the outlet.

BRIEF DESCRIPTION OF THE DRAWINGS

The drawings illustrate the best mode presently contemplated of carrying out the invention.

In the drawings.

DETAILED DESCRIPTION OF THE INVENTION

Figure 1:
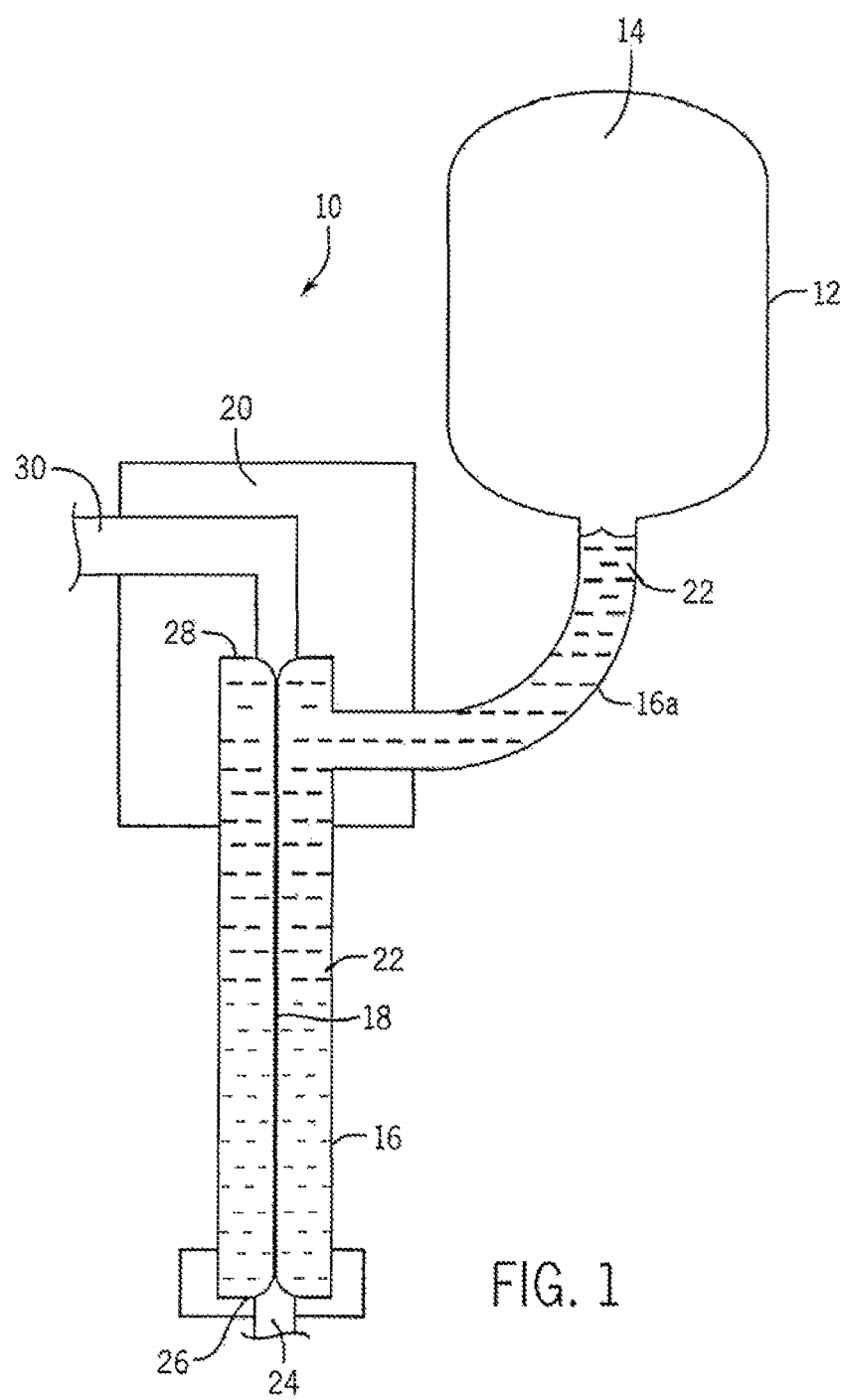
FIG. 1 is a diagram illustrating a fluid conduit arrangement of the present disclosure in an equilibrium stage.

In the following disclosure, it should be understood that the term fluid denotes any liquid, gaseous or other material capable of flow. The term working fluid refers to any fluid being transferred or moved, and the term compression fluid designates fluid being used to evacuate working fluid from an arrangement or system.

Referring now to the drawings, FIGS. 1-4 illustrate a fluid conduit arrangement 10 useful in controlling fluid flow between different locations by means of a closed system requiring no external power supply and normally necessitating no maintenance.

The fluid conduit arrangement 10 is generally comprised of a rigid reservoir or accumulator 12 charged with a compression fluid e.g. pressurized gas 14, such as air, a first or outer rigid conduit or hose 16 which is non-compressible and non-expandable and includes a rigid non-compressible and non-expandable extension conduit or hose 16a enabling communication between the accumulator 12 and the first conduit 16, a second or inner flexible conduit or hose 18 which is compressible and expandable and is disposed within the first conduit 16, and a retaining and discharge structure 20.

A first working fluid 22, in the form of a gas or liquid, such as anti-freeze, is held in a closed system and under pressure from the pressurized gas 14, between the first conduit 16 and the accumulator 12 via the extension conduit 16a. That is, first working fluid 22 continuously surrounds the second conduit 18, remains captive in conduits 16 and 16a and is able to freely flow to and from the accumulator 12 via the extension conduit 16a A second working fluid 24, in the form of a gas or liquid, such as Diesel exhaust fluid (DEF), is designed to flow between an inlet 26 of the second conduit 18 and an outlet 28 of the second conduit 18. Inlet 26 is located adjacent the bottom of first conduit 16, and outlet 28 is positioned adjacent the top of first conduit 16. Outlet 28 is in communication with a discharge passageway 30 framed in the retaining and discharge structure 20, which structure maintains second conduit 18 within first conduit 16, and also connects first conduit 16 and extension conduit 16a to the accumulator 12.

FIG. 1 depicts an equilibrium stage of the fluid conduit arrangement 10 in which pressurized air 14 in the accumulator 12 presses down on first working fluid 77 resulting in an increased pressure on second conduit 18 causing it to be collapsed. In the equilibrium stage, there is no supply pressure for second working fluid 24 at inlet 26.

Figure 2:
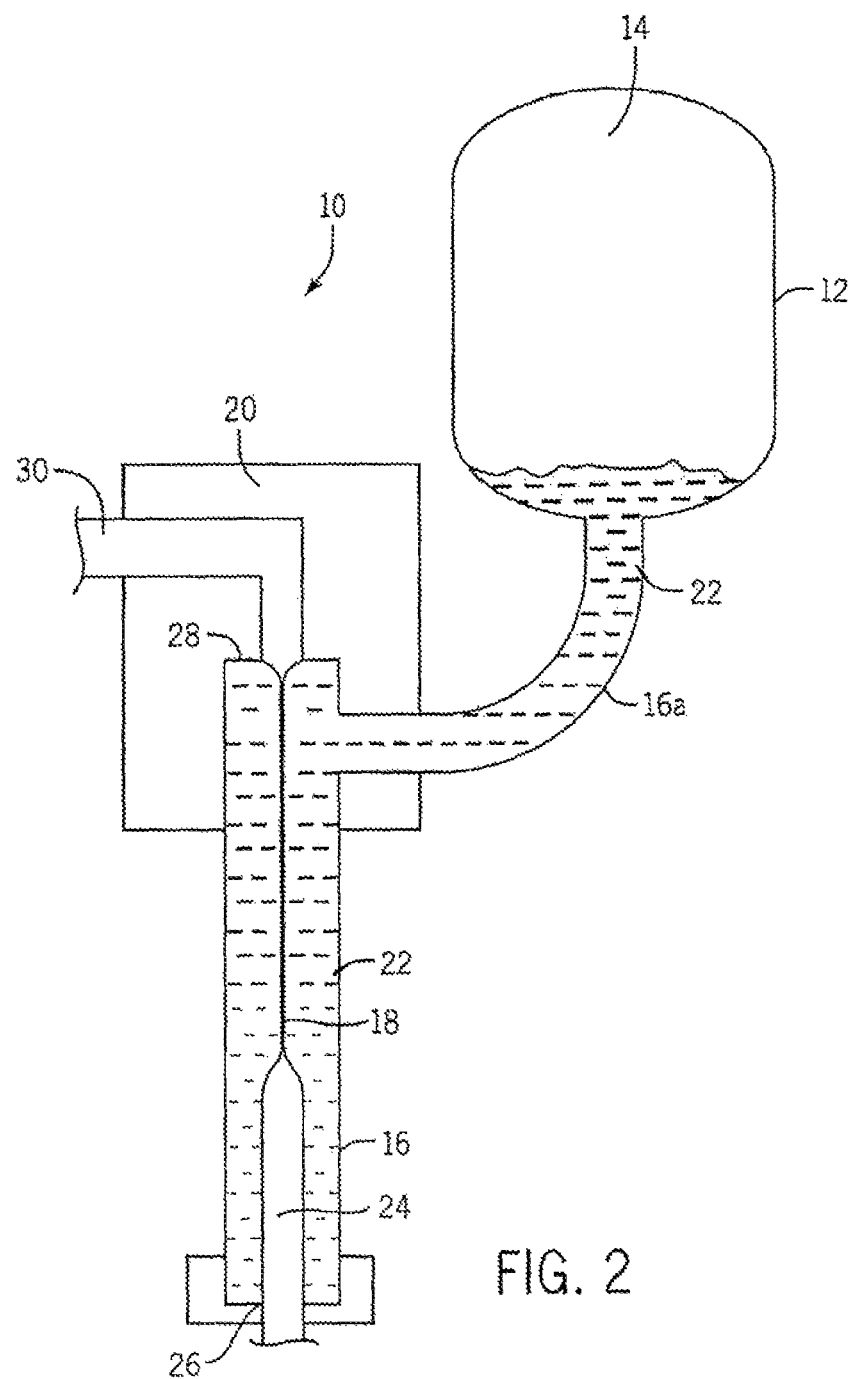
FIG. 2 is a diagram of the fluid conduit arrangement of FIG. 1 illustrating the onset of a supply pressure stage.

FIG. 2 represents the onset of a supply pressure stage in the fluid conduit arrangement 10 wherein supply pressure for second working fluid 24 is introduced at the inlet 26. This supply pressure is greater than the pressure in the accumulator 12 plus the depth pressure caused by the first working fluid 22. As a result, second conduit 18 expands and second working fluid 24 begins to flow therethrough. As second conduit 18 expands, the first working fluid 22 surrounding second conduit 18 must be evacuated to make room for the expansion of second conduit 18. This expansion of second conduit 18 causes first working fluid 22 to flow into the accumulator 12. As first working fluid 22 flows into the accumulator 12, the pressure in the accumulator 12 rises due to the air 14 being compressed. The resultant increase in accumulator pressure is not enough to overcome the supply pressure of second working fluid 24.

Figure 3:
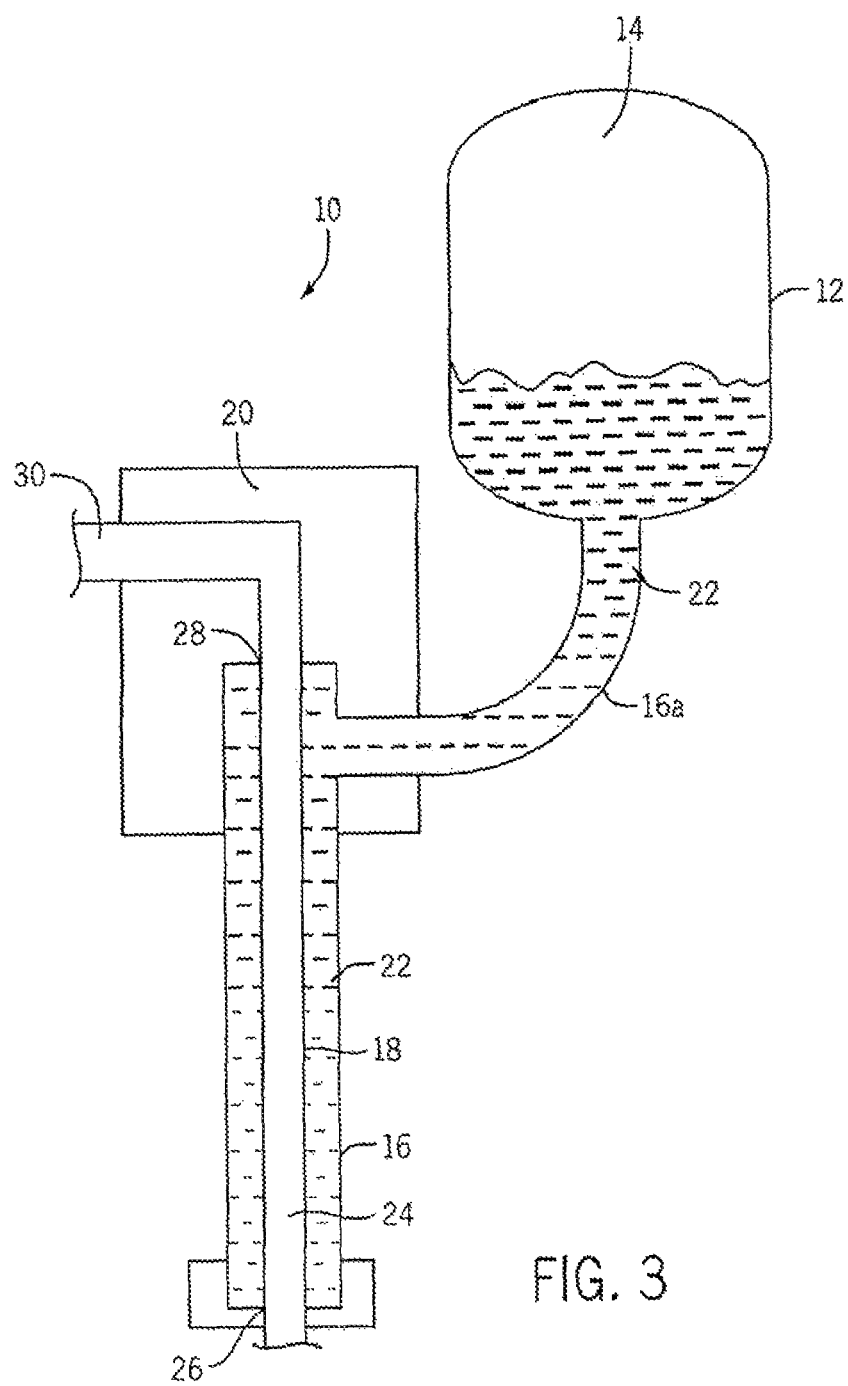
FIG. 3 is a diagram of the fluid conduit arrangement of FIG. 1 illustrating a constant flow stage.

FIG. 3 illustrates a constant flow stage of the fluid conduit arrangement 10 wherein, once second conduit 18 is fully expanded, second working fluid 24 flows freely therethrough and exits through the outlet 28 and the discharge passageway 30. At this point, the pressure in the accumulator 12 is steady because second conduit 18 is not further expanding or contracting. The resultant pressure in the accumulator 12 is less than the supply pressure of second working fluid 24.

Figure 4:
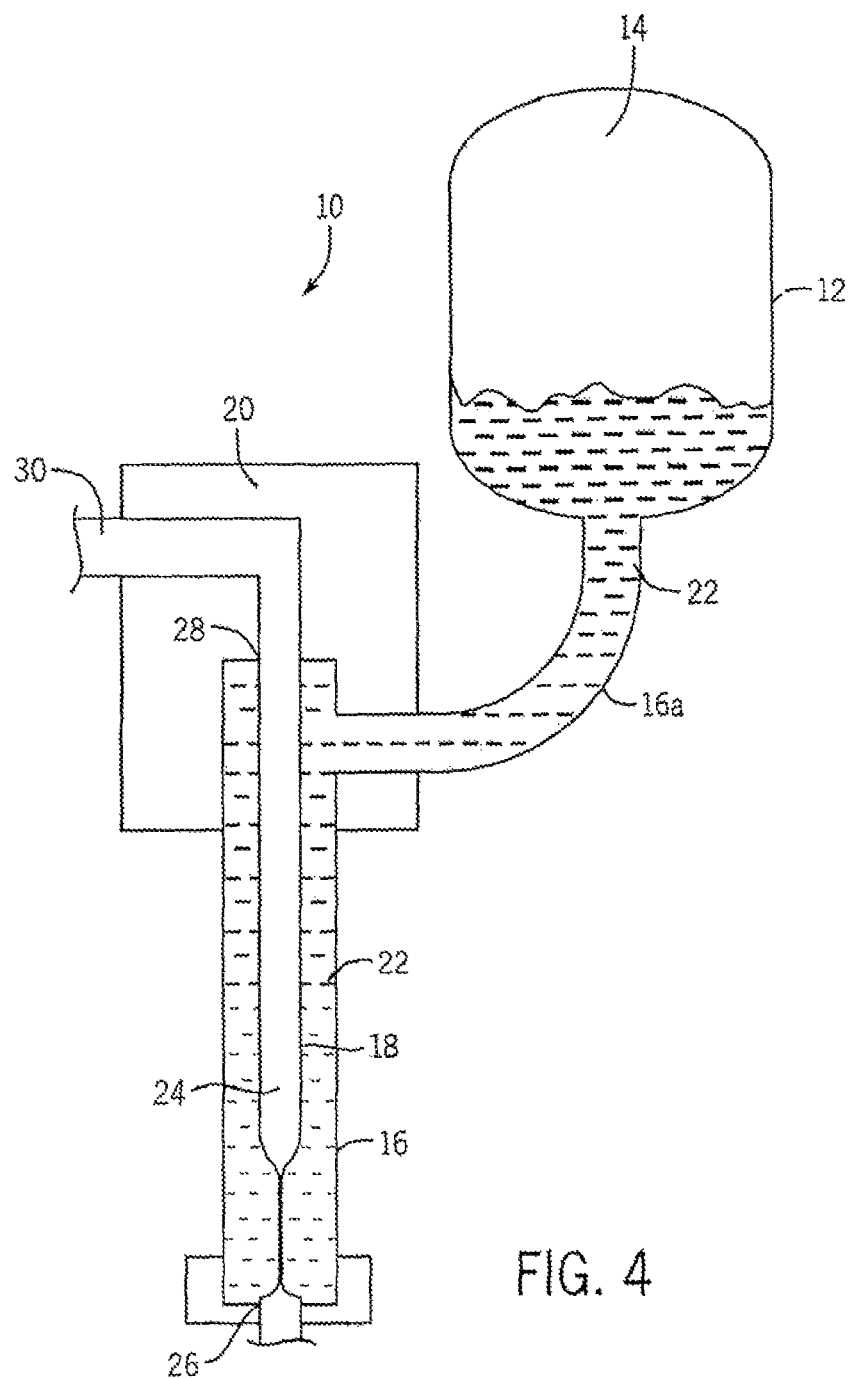
FIG. 4 is a diagram of the fluid conduit arrangement of FIG. 1 illustrating a pressure shutoff stage.

FIG. 4 exemplifies a pressure shutoff stage of the fluid conduit arrangement 10. If and when the supply pressure for second working fluid 24 is shut off, the pressure from the accumulator 12 will become the dominant pressure and collapse the second conduit 18. Ideally, first working fluid 22 will have a higher density than second working fluid 24. This will promote second conduit 18 to close from the bottom up. As second conduit 18 closes, all remaining second working fluid 24 is evacuated through the discharge passageway 30. Once second conduit 18 is completely collapsed, the fluid conduit arrangement 10 returns to the equilibrium stage shown in FIG. 1.

The fluid conduit arrangement 10 of the present disclosure removes the need for any draining of hoses and labor related thereto, buckets and special valves. Further, the arrangement 10 eliminates the risk of spills and cleanup when draining hoses.

It should be appreciated that evacuation pressure can be provided by any internal or external stored or created pressure supply other than reservoir or accumulator 12, such as a gas or liquid cylinder or canister, pump, gravity, etc. in any fluid state. Evacuation can be accomplished in any orientation using optimized compression fluids such that the compression encourages working fluid movement/flow in any desired direction. The orientation of the arrangement or system is not limited to that depicted in the drawings, and can be configured for working fluid flow in any direction or multiple directions.

It should also be understood that the retaining and discharge structure 20 can be any fitting or block that retains both conduits 16, 18 while isolating compression fluid from working fluid while also allowing the collapsing of the inner conduit 18 to force inner fluid directional flow. Such fitting or block can be configured to the needs of the user (i.e. swivel coupling, threaded coupling, fluid receiver/nozzle, etc.). At least one fitting or block will also have a path for compression fluid to pass as needed for compressing inner conduit 18.

Various alternatives are contemplated as being within the scope of the following claims particularly pointing out and distinctly claiming the subject matter regarded as the invention.

What is claimed is:

1. A fluid conduit evacuation arrangement comprising:
   a reservoir containing a pressurized gas therein;
   an outer rigid conduit in fluid communication with the reservoir and containing a first fluid under pressure from the pressurized gas within a closed system defined by the reservoir and the outer rigid conduit; and
   an inner flexible conduit configured for conducting a second fluid therethrough upon application of a supply pressure, the inner flexible conduit being disposed within the outer rigid conduit and being subjected to the pressurized first fluid in surrounding relationship therewith such that the second fluid is normally prevented from flowing into the inner flexible conduit,
   whereby relative differences between the pressurized first fluid and second fluid enable the inner flexible conduit to either expand and permit free flow of the second fluid therethrough, or collapse and completely evacuate the second fluid therefrom.

2. The fluid conduit evacuation arrangement of claim 1, wherein the reservoir is rigid.

3. The fluid conduit evacuation arrangement of claim 1, wherein the outer rigid conduit includes an extension conduit.

4. The fluid conduit evacuation arrangement of claim 3, wherein the outer rigid conduit and the extension conduit are non-compressible and non-expandable.

5. The fluid conduit evacuation arrangement of claim 3, wherein the first fluid continuously surrounds the inner flexible conduit, remains captive in the outer rigid conduit and the extension conduit, and is able to flow freely to and from the reservoir via the extension conduit.

6. The fluid conduit evacuation arrangement of claim 3, wherein the inner flexible conduit has an inlet located adjacent a bottom of the outer rigid conduit, and an outlet positioned adjacent a top of the outer rigid conduit.

7. The fluid conduit evacuation arrangement of claim 6, wherein the second fluid is flowable between the inlet and the outlet.

8. The fluid conduit evacuation arrangement of claim 6, wherein a retaining and discharge structure maintains the inner flexible conduit within the outer rigid conduit, and connects the outer rigid conduit and the extension conduit to the reservoir.

9. The fluid conduit evacuation arrangement of claim 8, wherein the outlet is in communication with a discharge passageway formed in the retaining and discharge structure.

10. The fluid conduit evacuation arrangement of claim 8, wherein the inlet is spaced from the retaining and discharge structure.

11. The fluid conduit evacuation arrangement of claim 1, wherein the first fluid is a gas or a liquid.

12. The fluid conduit evacuation arrangement of claim 1, wherein the second fluid is a gas or a liquid.

13. The fluid conduit evacuation arrangement of claim 1, wherein the first fluid is antifreeze.

14. The fluid conduit evacuation arrangement of claim 1, wherein the second fluid is diesel exhaust fluid.

15. The fluid conduit evacuation arrangement of claim 1, wherein a density of the first fluid is greater than a density of the second fluid.

16. A method of controlling and evacuating fluid between different locations comprising the steps of:
   a) providing a reservoir containing a pressurized gas therein;
   b) providing an outer rigid conduit in fluid communication with the reservoir and containing a first fluid under pressure from the pressurized gas within a closed system defined by the reservoir and the outer rigid conduit; and
   c) providing an inner flexible conduit configured for conducting a second fluid therethrough upon application of a supply pressure, the inner flexible conduit being disposed within the outer rigid conduit and being subjected to the pressurized first fluid in surrounding relationship therewith such that the second fluid is normally prevented from flowing into the inner flexible conduit,
   whereby relative differences between the pressurized, first fluid and second fluid enable the inner flexible conduit to either expand and permit free flow of the second fluid therethrough, or collapse and completely evacuate the second fluid therefrom.

17. The method of claim 16, wherein, in an equilibrium stage, pressurized gas in the reservoir presses down on the first fluid resulting in an increased pressure on the inner flexible conduit causing it to be collapsed.

18. The method of claim 17, wherein, in a supply pressure stage, a supply pressure is applied to the second fluid at an inlet of the inner flexible conduit such that the inner flexible conduit expands, allowing second fluid to flow therethrough, the expansion of the inner flexible conduit causing first fluid to flow into the reservoir, and pressure in the reservoir to increase.

19. The method of claim 18, wherein, in a constant flow stage, once inner flexible conduit is fully expanded, second fluid flows through the inner flexible conduit and exits from an outlet thereof, the resultant pressure in the reservoir being less than the supply pressure of the second fluid.

20. The method of claim 19, wherein, in a pressure shut-off stage, with the supply pressure being off, the pressure in the reservoir collapses the inner flexible conduit, and second fluid is evacuated out of the inner flexible conduit through the outlet.

* * * * *